United States Patent [19]

Weber

[11] Patent Number: 5,297,707

[45] Date of Patent: Mar. 29, 1994

[54] CONTAINER AND VEHICLE COMBINATION AND A METHOD FOR CARRYING SPORTING EQUIPMENT AND CLOTHES

[76] Inventor: Lee Weber, R.R. #3, Box 385A, Ponca City, Okla. 74604

[21] Appl. No.: 982,587

[22] Filed: Nov. 27, 1992

[51] Int. Cl.$^5$ ............................................. B60R 7/00
[52] U.S. Cl. ................................................... 224/42.42
[58] Field of Search .................... 224/42.42, 313, 327, 224/328; 296/37.6; 220/501; 503, 505, 524; 206/315.11, 289, 298, 562, 563

[56] References Cited

U.S. PATENT DOCUMENTS

| | | | |
|---|---|---|---|
| 1,793,832 | 2/1931 | Yazum | 224/42.32 |
| 2,613,805 | 10/1952 | Frolich | 206/298 |
| 2,987,153 | 4/1961 | Brindle | 224/42.42 |
| 4,770,330 | 9/1988 | Bonstead et al. | 224/42.42 |
| 4,848,626 | 7/1989 | Waters | 224/273 |
| 5,004,103 | 4/1991 | Connors et al. | 206/563 |

*Primary Examiner*—Renee S. Luebke
*Attorney, Agent, or Firm*—John W. Carpenter

[57] ABSTRACT

In combination a vehicle and a storage container for storing sporting equipment and clothes. The combination has a truck with a cab which includes a rear view cab glass and a truck bed coupled to the cab. A storage container is removably disposed on the truck bed and is releasably engaged to the truck bed sides and/or truck bed and/or both for supporting and storing sporting equipment, clothes, and the like. The storage container comprises a bottom, a pair of generally L-shaped sides secured to the bottom, and a pair of end members secured to the pair of generally L-shaped sides. A partition member is secured to the bottom and to the pair of the generally L-shaped sides. A method for transporting sporting equipment such as clothes, and other accessories is also provided.

13 Claims, 4 Drawing Sheets

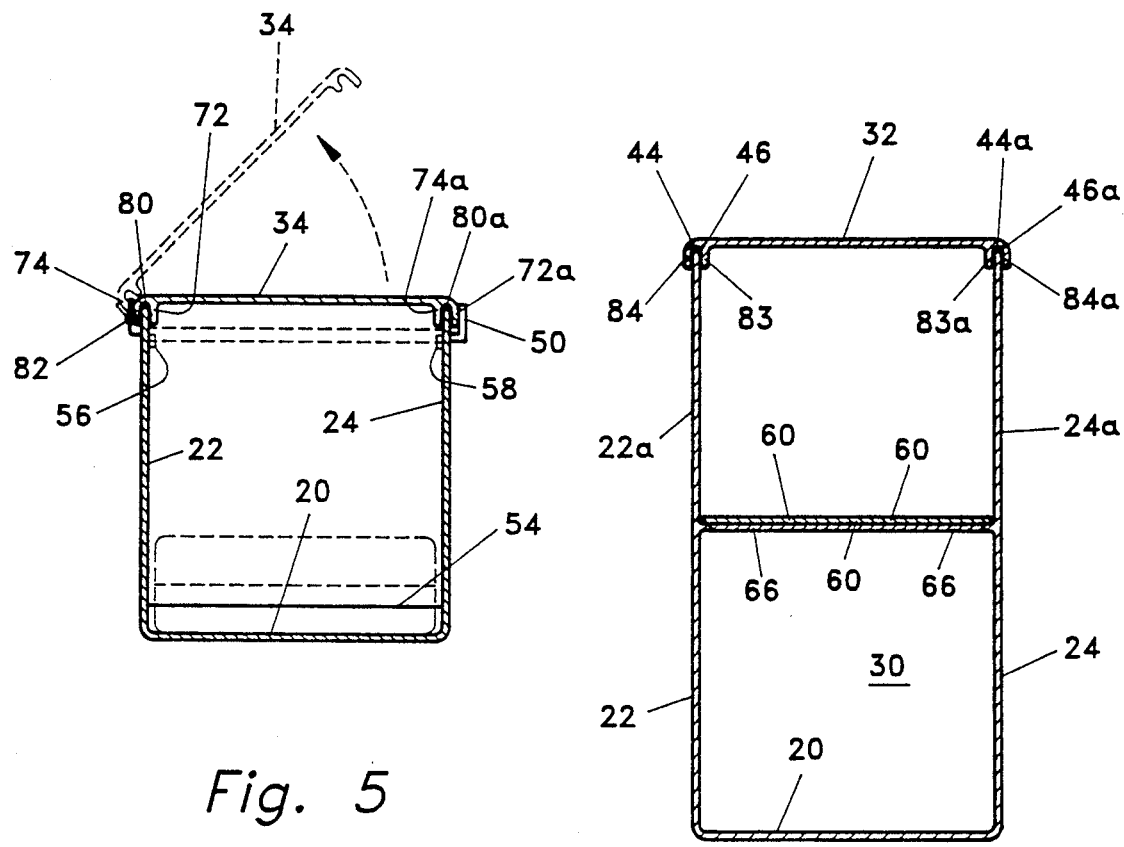
Fig. 5
Fig. 6
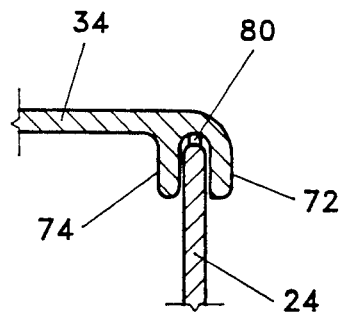
Fig. 7
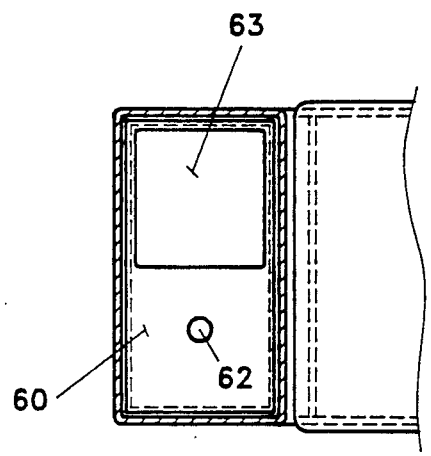
Fig. 8

CONTAINER AND VEHICLE COMBINATION AND A METHOD FOR CARRYING SPORTING EQUIPMENT AND CLOTHES

1. FIELD OF THE INVENTION

This invention is related to a container and a vehicle in combination therewith for carrying sporting equipment, clothes, and other accessories. More specifically, the present invention provides an apparatus which is supported by the back of a pick-up truck, or other similar vehicle, and a method for transporting sporting equipment (e.g. golf clubs, hunting rifle, hunting clothes, and other traveling accessories such as suitcases and the like).

2. DESCRIPTION OF THE PRIOR ART

A patentability investigation was conducted and the following U.S. patents by numbers were discovered: U.S. Pat. No. 2,502,963 to Klee; U.S. Pat. No. 2,653,741 to Senk; U.S. Pat. No. 4,215,896 to Drouin; U.S. Pat. No. 4,260,091 to French et al: U.S. Pat. No. 4,580,827 to Feagan; U.S. Pat. No. 4,892,346 to Berlin; and U.S. Pat. No. 4,946,215 to Taylor. None of the foregoing prior art U.S. patents teach or suggest the specific apparatus and/or method of the present invention.

SUMMARY OF THE INVENTION

The present invention accomplishes its desired objects by broadly providing in combination a vehicle and a storage container for storing sporting equipment and clothes. The present invention, more specifically, provides an apparatus for storing clothes and/or sporting equipment wherein the apparatus is formed in combination with a vehicle. Further, a method for transporting sporting equipment and/or clothing in a container disposed in the bed of a truck vehicle is provided. The combination comprises a truck having a cab including a rear cab glass and a truck bed coupled to the cab, and a container means for storing sporting equipment and clothing. The container means comprises a bottom having a pair of generally L-shaped sides secured thereto. A first end member and a second end member are secured to the generally L-shaped sides. A partition member is secured to the bottom and to the pair of generally L-shaped sides. A first top member is pivotally secured to the first end member and a second top member is pivotally secured to one of the L-shaped sides. A side view mirror is mounted on the truck, and a rear view mirror is secured in the truck cab such that when the driver of the truck looks through the rear view mirror, he can see out or through a back rear glass window of the truck cab and above a lower part of the storage container.

The present invention further accomplishes its desired objects by broadly providing a method for transporting sporting equipment and other accessories comprising the steps of:

(a) providing a truck comprising a cab including a rear cab glass and a truck bed coupled to the cab;

(b) providing a container means for storing sporting equipment and other accessories comprising a bottom, a pair of generally L-shaped sides secured to the bottom, a first end member secured to the generally L-shaped side, a second end member secured to the generally L-shaped sides, a partition member secured to the bottom and to the pair of generally upright sides, a first top member pivotally secured to the first end member, a second top member pivotally secured to one of the L-shaped sides, a generally horizontal support member removably engaged to the first end member and to the partition member, the horizontal support member having a structure defining at least one opening for inserting a golf club bag containing golf clubs between the first end member and the partition member and for having the golf club bag supported by the bottom, the partition member further comprising a structure defining at least one aperture for supporting at least one gun in one generally vertical position;

(c) disposing a rifle or a gun through the aperture of the horizontal support member;

(d) disposing a golf bag through the opening of the horizontal support member; and (e) pivotally coupling a bar member to one of the L-shaped sides for hanging at least one clothing member on the bar member.

It is therefore an object of the present invention to provide a combination container and vehicle and a method for carrying sporting equipment and clothes.

These, together with the various ancillary objects and features which will become apparent to those skilled in the art as the following description proceeds, are attained by this novel combination container and vehicle and method for carrying sporting equipment and clothes as shown with reference to the accompanying drawings by way of example only, wherein:

BRIEF DESCRIPTION

FIG. 5 is a vertical sectional view taken in direction of the arrows and along the plane of line 5—5 in FIG. 2;

FIG. 6 is a cross sectional view of part of the container;

FIG. 7 is a partial vertical sectional view taken in direction of the arrows and along the plane of line 7—7 in FIG. 2;

FIG. 8 is a horizontal sectional view taken in direction of the arrows and along the plane of line 8—8 in FIG. 2;

Figure 3:
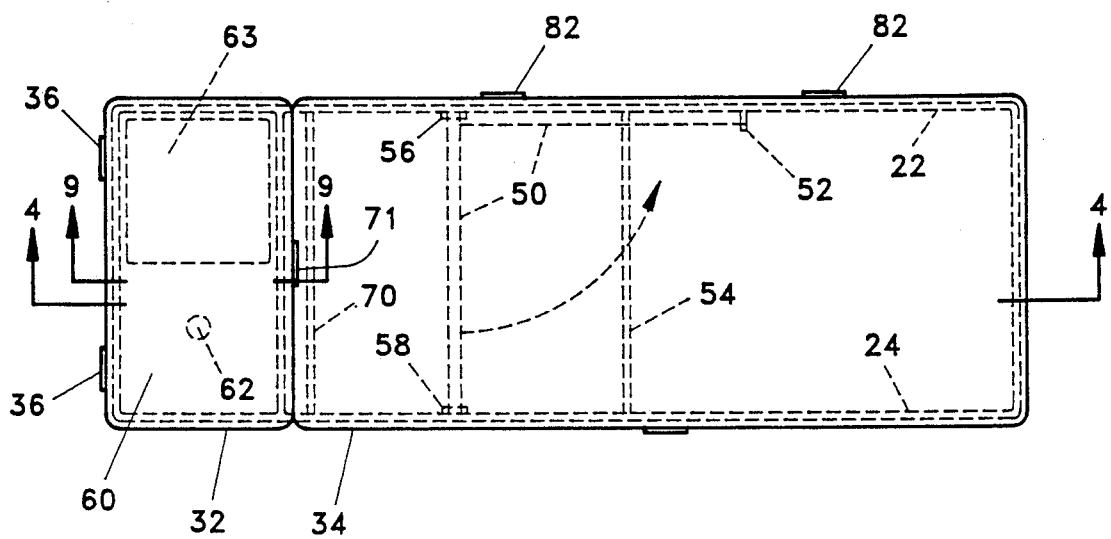
FIG. 3 is a top plan view of the storage container of the present invention.
Figure 9:
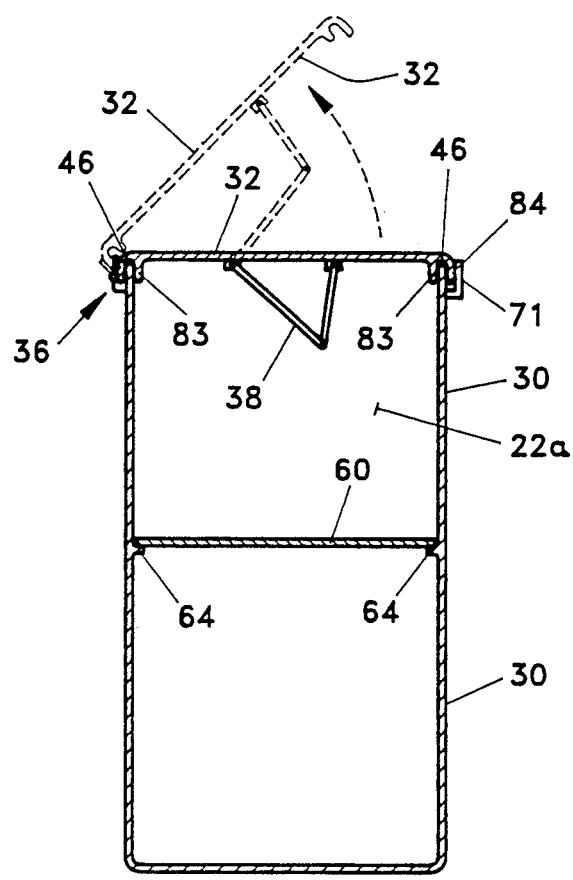
Figure 10:
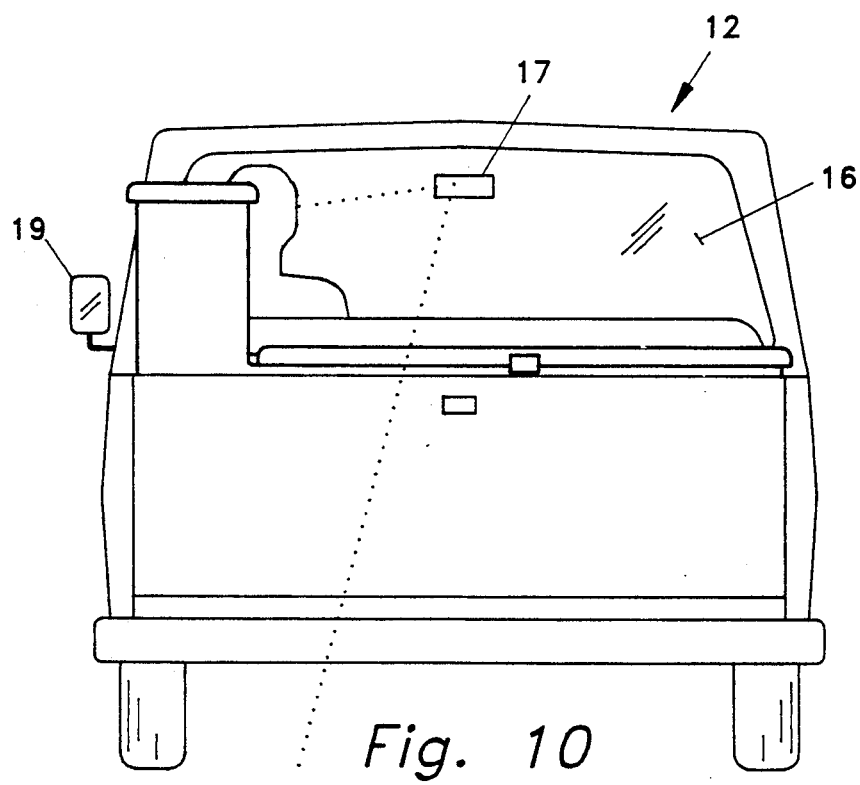

FIG. 9 is a vertical sectional view taken in direction of the arrows and along the plane of line 9—9 in FIG. 3, and disclosing the hinge member which pivotally secures the top to the end of the container and the foldably collapsible support member having one end pivotally secured to an L-shaped side of the container and the other end pivotally secured to the lid or top; and FIG. 10 is a rear elevational view of the back of the cab of a truck having a rear cab glass and disclosing that the driver of the vehicle is capable of looking at the rear view mirror and being able to see over the majority of the storage container while the L-shaped sides rise above the rear cab glass immediately behind the driver of the vehicle.

DETAILED DESCRIPTION OF THE INVENTION

Figure 4:
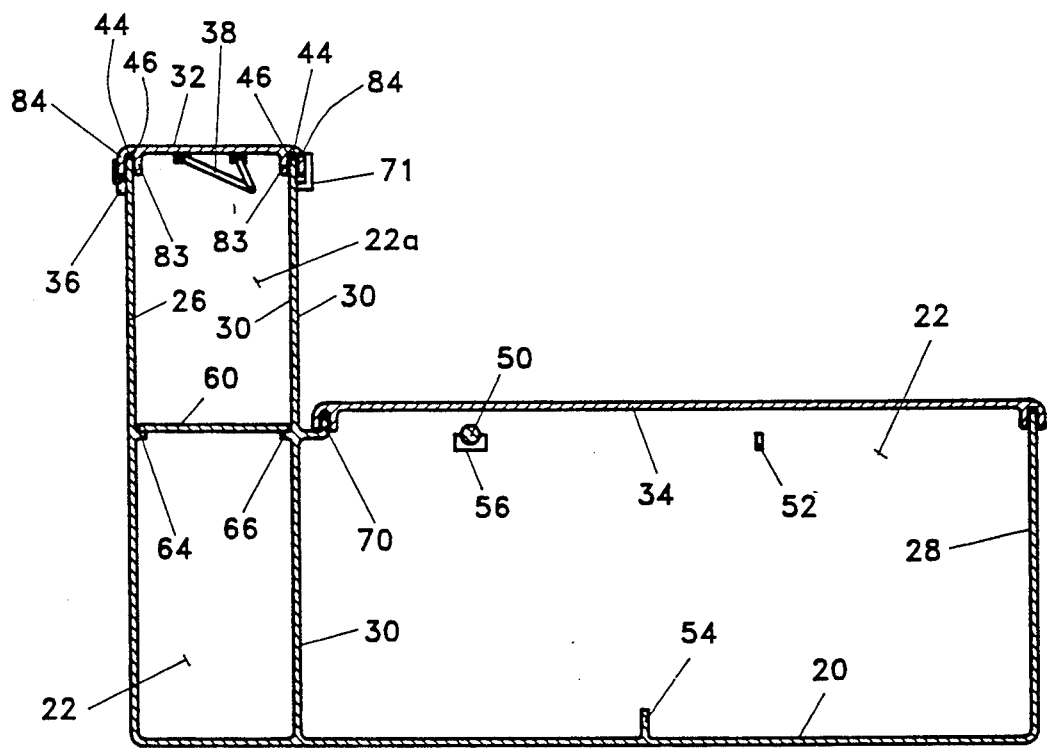
FIG. 4 is a vertical sectional view taken in direction of the arrows and along the plane of line 4—4 in FIG. 3.

Referring in detail now to the drawings wherein similar parts of the invention are identified by like reference numerals there is seen a vehicle, generally illustrated as 10 and comprising a truck cab, generally illustrated as 12, a truck bed generally illustrated as 14, a rear cab glass generally illustrated as 16, and a container means, generally illustrated as 18. The container 18 is supported by the truck bed 14 and is preferably secured thereto or to the upstanding walls 15 of the truck bed 14. An inside rear view mirror 17 is secured to the inside of the truck cab 12, and an outside rear view mirror 19 is secured to the outside of the truck cab 12. The container means 18 comprises, as best shown in FIGS. 3 and 4, a bottom member 20 secured to a pair of generally L-shaped sides 22 and 24 having uprising ends 22a and 24a. A first end member 26 is secured to the bottom 20 and the generally L-shaped sides 22 and 24. The container means 18 also comprises a second end member 28 secured to the bottom 20 and the generally L-shaped sides 22 and 24. A partition member 30 is secured to the generally L-shaped sides 22 and 24. The partition member 30 is formed with a generally L-shaped lip member 70 which as will be further explained below, is for engaging a side of a top member 34.

The container means 18 additionally comprises a first top member 32, pivotally secured to the first end member 26, and a second top member 34 pivotally secured to one of the L-shaped sides 22 through a hinge assembly 82. As best shown in FIG. 3, there is seen a generally horizontal support bar 50 attached by a hinge means 56 to one of the generally L-shaped sides 22 and removably engaged to a support means 58. The support bar 50 is for supporting clothes 27, especially when disposed on hangers 29. The support means 58 is releasably secured to the generally L-shaped side 24 which is opposite to side 22. One of the salient features of the present invention is that the uprising ends 22a and 24a extend above the walls 15 and partly cover the rear cab glass 16 immediately behind a driver 31 of the vehicle 10 (see FIG. 10) such that when the driver 31 looks into and/or through the rear view mirror 17 (or through the cab glass 16), the driver is able to see through the cab glass 16 and over the remaining structural portions of the L-shaped sides 22 and 24 and over the top member 34. Obviously, such a salient feature is a safety feature, especially when the vehicle 10 is being driven.

Figure 1:
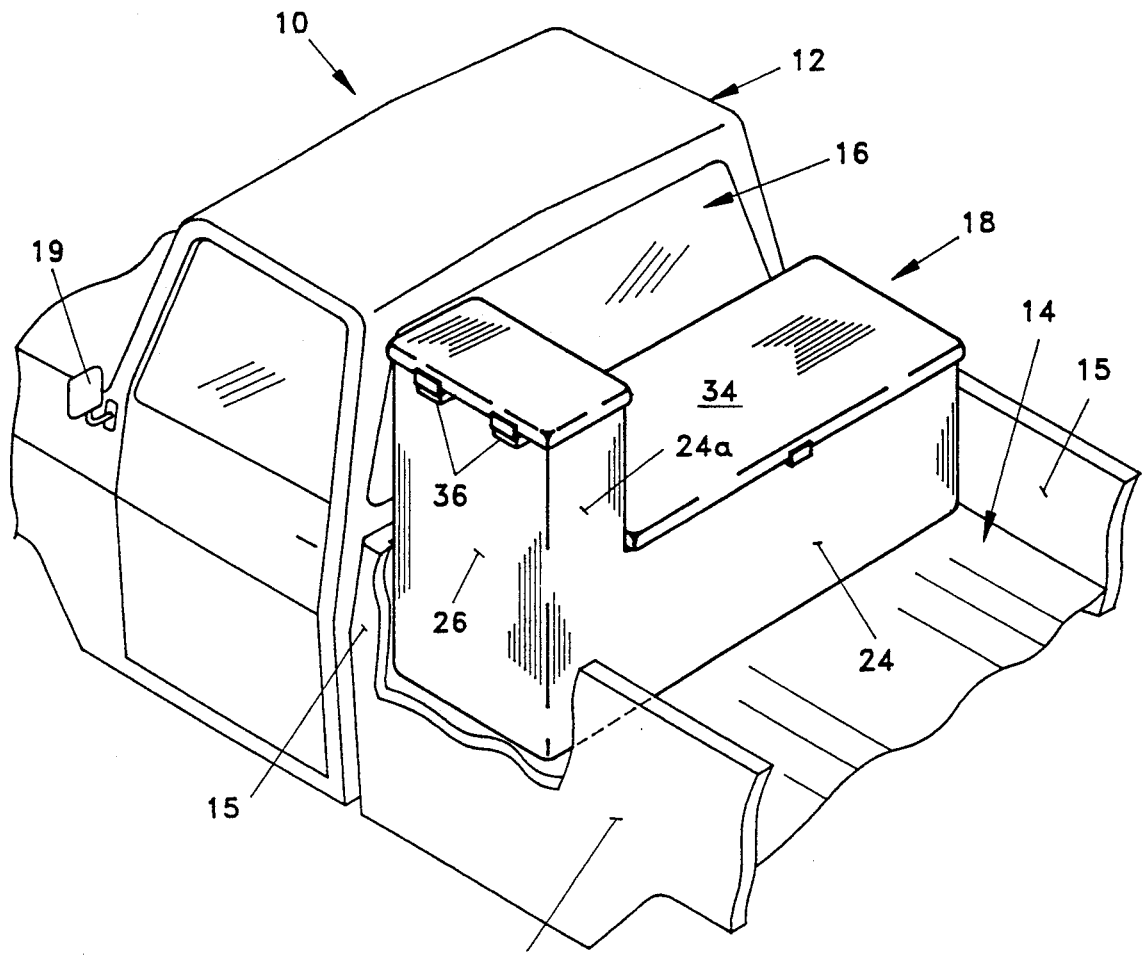
FIG. 1 is a partial perspective view of the combination of the present invention having a vehicle and storage container disposed in the back of a vehicle.
Figure 2:
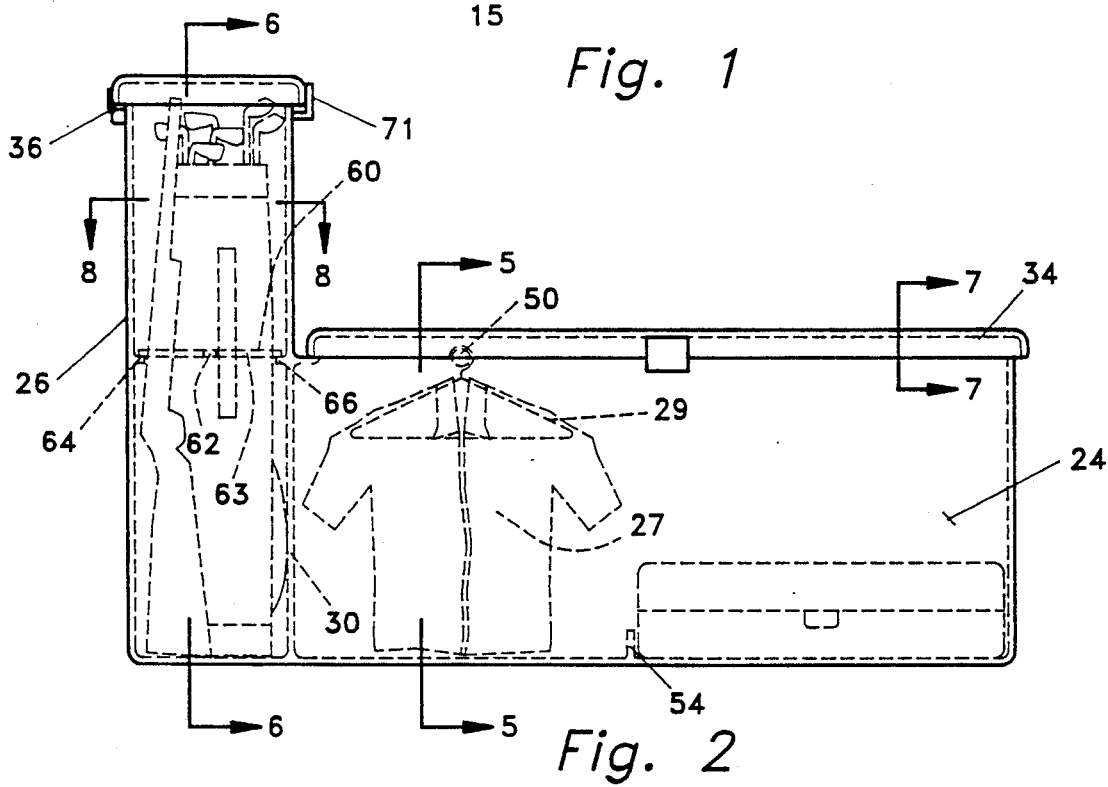
FIG. 2 is a side elevational view of the storage container of the present invention with the dotted lines representing the sporting equipment, the clothes, and the suitcase that the storage container is capable of carrying.

A clamping means 52 (see FIG. 3) is attached to the generally L-shaped side 22 for the purpose of engaging the generally horizontal support bar 50 when the same is not in use. The clamping means 52 may be any suitable clamping or engaging means that is capable of holding or retaining the support bar 50 against the L-shaped side 22. The container means additionally comprises a generally horizontal support member 60 engaged to said first end member 26 and to the partition member 30 such that the generally horizontal support member 60 is removably engaged from the first end member 26 and the partition member 30. There is additionally seen, as best shown in FIG. 4, a pair of support ledge members 64 and 66 secured to the side member 26 and the partition member 30 respectively for the purpose of removably supporting the generally horizontal support member 60. As best shown in FIG. 8 the generally horizontal support member 60 comprises a structure containing aperture 62 and aperture 63. Upon disposal of a hunting rifle or similar apparatus between the uprising ends 22a and 24a and through aperture 62, as best shown in FIG. 2, the aperture 62 holds the aforementioned in a generally vertical position. The generally square-shaped aperture 63 is for conveniently supporting other athletic equipment, such as golf clubs or the like (see FIG. 2) As previously indicated, the partition member 30 also comprises a the L-shaped lip member 70 for the purpose of engaging the second top member 34. The partition member 30 also includes a lug or lip 71 for frictionally engaging the top 32. Continuing to refer to FIG. 2, there is additionally seen a partial partition member 54 secured to the bottom 20, for the purpose of receiving and holding a suitcase or a similar container, between the second end member 28 and the partial partition member 54.

Referring now to FIG. 5, (the second top member 34 in vertical cross section), there is seen said second top member 34, a hinge assembly 82, said bottom member 20, and said generally L-shaped sides 22 and 24. The second top member 34 is secured to a hinge means 82, and said hinge means 82 is secured to one of the generally L-shaped sides 22 whereby the second top member 34 may be hingeably operated. Referring in detail now to the closure structure (refer to FIG. 7) of the second top member 34, there is seen an outer lip member 72, an inner lip member 74, and a gasket 80. The outer lip member 72 and inner lip member 74 comprise a vertical cross section U-shaped channel. There is additionally seen the side member 24 which slidably passes between the aforementioned outer lip member 72 and inner lip member 74, that comprise the vertical cross section inverted U-shaped channel, and engages the gasket so.

Referring in detail now to FIGS. 4 and 6, there is seen the first top member 32 mounted on and to the uprising ends 22a and 22b. The top member 32 comprises an inner lip member 83 and an outer lip member 84. The top member also comprises a collapsible support member 38 which is secured to the first top member 32 and to uprising ends 22a and 24a. The outer lip member 84 and the inner lip member 83 define in vertical cross section an inverted U-shape channel 44 on each of the four edges of the top member 32 such that the partition member 30, the uprising ends 22a and 24a, and end member 26, all slidably engage the channel 44. Additionally, a gasket 46 is secured to the inner rim of the channel 44 such that the rubber gasket 46 engages the top edge of the partition member 30, the uprising ends 22a and 24a, and the end member 26 when the top member 32 is in the closed position as best shown in FIGS. 4 and 9. As best shown in FIG. 9, the collapsible support 38 comprises any suitable means for generally collapsibly retaining the top member 32 in a open position when the top member 32 is opened, such that the collapsible support 38 may be foldably collapsed when the top member 32 is in a closed position. As further best shown in FIG. 6, the first top member 32 comprises another inner lip member 83a and another outer lip member 84a defining another inverted U-shaped channel 44a in vertical cross section. The inverted U-shaped channel 44a slidably receives side 24a. As previously mentioned, each of the four edges of the top member 32 comprises such a channel 44 (shown in FIG. 6 as channels 44–44a.) Likewise, as shown in FIG. 5, the second top member 34 comprises the above-described channel arrangement, having the inner lip member 74 and the outer lip member 72 comprising another inverted U-shaped channel.

Continuing to refer to the drawings for operation of the invention and the method for transporting sporting equipment, the container 18 is disposed on the truck bed 14 by any suitable means. The first top member 32 may be hingeably operated to expose the opening beneath for disposing a golf club bag in the square-shaped aperture 63 of the generally horizontal support member 60, or a rifle-type gun in the circular aperture 62 of the same. Additionally the first top member 32 may be hingeably opened to facilitate removal of the generally horizontal support member 60. The second top member 34 may be operated hingeably to open the container 18 so that clothing articles 27, preferrably disposed on clothes hangers 29 may be disposed therein on the generally horizontal support bar 50. The support bar 50 is hingeably secured to one of the generally L-shaped sides 22 and may be operated so that it may be removeably engaged to the support means 58 on the opposite L-shaped side 24, or if said support bar 50 is not to be used, it may be removably engaged to the clamping means 52. Additionally the second top member 34 may be hingeably opened to facilitate disposal of a suitcase or similar container between the partial partition member 54 and the second side member 28.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. In combination a vehicle and a storage container for storing sporting equipment and clothes; the combination comprises a truck having a cab including a rear cab glass and a truck bed coupled to the cab, and a container means supported by the truck bed for storing sporting equipment and clothing; said container storage means comprising a bottom; a pair of generally L-shaped sides secured to the bottom, and a first end member secured to the generally L-shaped sides, and a second end member secured to the generally L-shaped sides, and a partition member secured to said bottom and to said pair of generally L-shaped sides; a first top member pivotally secured to said first end member; a second top member pivotally secured to one of said L-shaped sides; and a generally horizontal support member removably engaged to the first end member and to the partition member, said horizontal support member having a structure defining at least one opening for inserting a golf club bag containing golf clubs between the first end member and the partition member and for being supported by said bottom, said partition member further comprising a structure defining at least one aperture for supporting at least one gun in a generally vertical position.

2. The combination of claim 1 additionally comprising a first ledge member secured to said first end member.

3. The combination of claim 2 additionally comprising a second ledge member secured to said partition member, said first and second ledge members being adapted for removably supporting said horizontal support member.

4. The combination of claim 3 additionally comprising a partition lip member secured to the partition member for engaging the second top member.

5. The combination of claim 4 additionally comprising a bottom partition member secured to said bottom.

6. The combination of claim 5 additionally comprising a bar member pivotally attached to one of said generally L-shaped side members.

7. The combination of claim 6 additionally comprising at least one support member attached pivotally to said first top member, and to one of the L-shaped sides.

8. The combination of claim 7 wherein said second top member has a structure defining a first generally inverted U-shaped vertical cross-section channel and a second generally inverted U-shaped vertical cross-section channel.

9. The combination of claim 8 wherein said first generally inverted U-shaped vertical cross section channel having a first gasket, and said second generally U-shaped vertical cross-section channel having a second gasket.

10. The combination of claim 7 wherein said first top member has a structure defining a first generally inverted U-shaped vertical cross-section channel and a second generally inverted U-shaped vertical cross-section channel, a pair of U-shaped arms with one arm being engaged to a hinge member secured to the first side member.

11. The combination of claim 10 additionally comprising a side view mirror secured on said truck, and a rear view mirror in said cab such that when a driver of said truck looks to and through said rear view mirror the driver can see through the rear cab glass and above a lower part of the container means.

12. A method for transporting sporting equipment and other accessories comprising the steps of:
   (a) providing a truck comprising a cab including a rear cab glass and a truck bed coupled to the cab;
   (b) providing a container means for storing sporting equipment and other accessories comprising a bottom; a pair of generally L-shaped sides secured to the bottom, and a first end member secured to the generally L-shaped sides, and a second end member secured to the generally L-shaped sides, and a partition member secured to said bottom and to said pair of generally L-shaped sides; a first top member pivotally secured to said first end member; and a second top member pivotally secured to one of said L-shaped sides, a generally horizontal support member removably engaged to the first end member and to the partition member, said horizontal support member having a structure defining at least one opening for inserting a golf club bag containing golf clubs between the first end member and the partition member and for having said golf club bag supported by the bottom, said partition member further comprising a structure defining at least one aperture for supporting at least one gun in a generally vertical position;
   (c) disposing a rifle or a gun through the aperture of the horizontal support member;
   (d) disposing a golf bag through said opening of the horizontal support member;
   (e) pivotally coupling a bar member to one of said L-shaped sides for hanging at least one clothing member on the bar member.

13. The method of claim 12 additionally comprising engaging at least one clothes hanger on the bar member and removably disposing a suitcase between said partition member and said second end member.

* * * * *